C. A. McCARTHY.
CHAIN LOCK.
APPLICATION FILED OCT. 7, 1912.
1,082,813.
Patented Dec. 30, 1913.
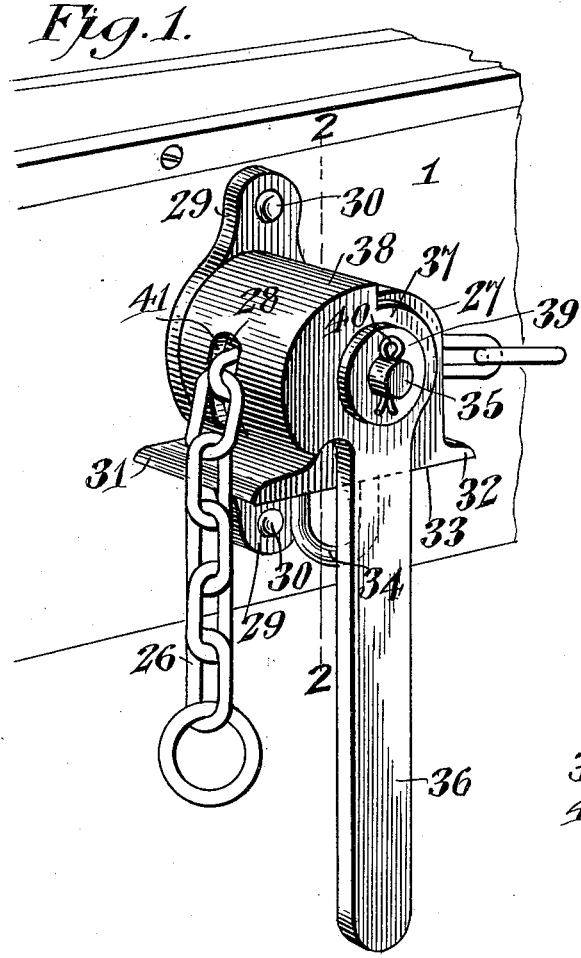
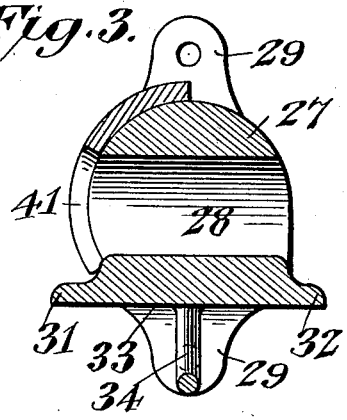
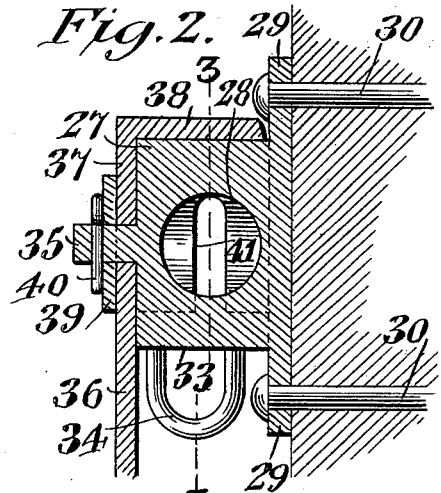
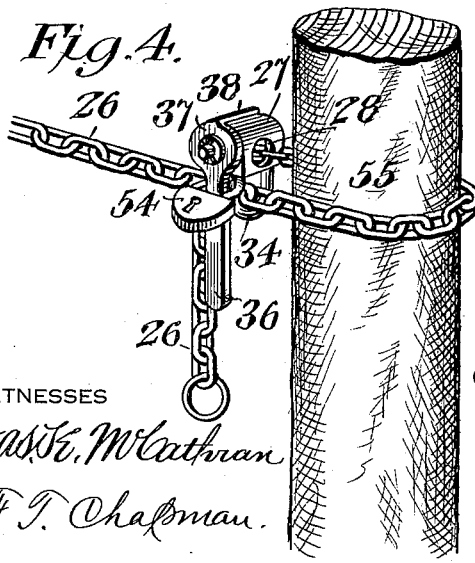
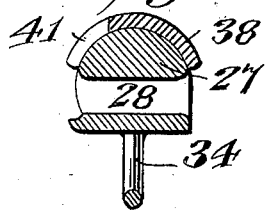
WITNESSES
Jas. E. McCathran
F. T. Chapman.
Charles A. McCarthy, INVENTOR
BY
E. G. Siggers
ATTORNEY
COLUMBIA PLANOGRAPH CO., WASHINGTON, D. C.

UNITED STATES PATENT OFFICE.

CHARLES ALBERT McCARTHY, OF DEMOPOLIS, ALABAMA, ASSIGNOR TO JOSEPH HEISLER, OF HATTIESBURG, MISSISSIPPI.

CHAIN-LOCK.

1,082,813.  Specification of Letters Patent.  Patented Dec. 30, 1913.

Application filed October 7, 1912. Serial No. 724,392.

*To all whom it may concern:*

Be it known that I, CHARLES A. MCCARTHY, a citizen of the United States, residing at Demopolis, in the county of Merengo and State of Alabama, have invented a new and useful Chain-Lock, of which the following is a specification.

This invention has reference to improvements in chain-locks, being directed to a chain-lock shown and described in Letters Patent No. 1,002,292, granted September 5, 1911, upon an application filed by me for a safety bolster-block and chain-lock.

The chain-lock forming the subject-matter of this invention is of general application, but is particularly useful in connection with safety bolster-blocks used for holding logs on logging wagons or railway cars, or the like, wherein the locking device may be released, to permit the removal of the logs, without danger to the operator.

The chain-lock of the present invention is so constructed as to hold a chain in a manner to prevent its accidental release under ordinary conditions of use, and also to provide for the ready release of the chain when such action is desired. Furthermore, provision is made for the securing of the chain-lock in a manner to prevent unauthorized manipulation thereof and, also, the release of the chain accidentally under circumstances which in the absence of the means for preventing the unauthorized manipulation of the device might cause such accidental operation.

The invention will be best understood from a consideration of the following detailed description, taken in connection with the accompanying drawings forming a part of this specification, with the further understanding that while the drawings show practical embodiments of the invention, the latter is by no means confined to any exact conformity with the showing of the drawings, but may be changed and modified so long as such changes and modifications mark no material departure from the salient features of the invention.

In the drawings:—Figure 1 is a perspective view of the chain-lock in position upon a bolster or other support. Fig. 2 is a section on the line 2—2 of Fig. 1. Fig. 3 is a section on the line 3—3 of Fig. 2 but omitting distant parts. Fig. 4 is a perspective view showing another application of the chain lock. Fig. 5 is a section of the structure shown in Fig. 4 similar to the section of Fig. 3, the chain engaging member being indicated in the inactive position.

The chain-lock comprises a body member 27 of general cylindrical shape having therethrough an approximately diametrical passage 28 about midway of its length. Formed at one end of the block 27 are ears 29 which may also be in diametric relation one to the other and these ears are traversed by bolts 30 or other suitable securing devices for attaching the block to a support 1 in the structure shown in Fig. 1, this support being of any suitable character, such as the bolster indicated in the aforesaid Letters Patent. At the opposite ends, but on the same side of the passage 28, the body member 27 is formed with outstanding ledges 31, 32, for a purpose which will presently appear, and these ledges merge into a face 33 on which there is formed, or to which there is attached a yoke 34, also for a purpose which will presently appear.

The body 27 at the end remote from the ears 29 is formed with, or has secured thereto, an axial stud 35 constituting a pivot support for a hand lever 36 provided with a passage for the stud 35 and about this passage expanded into a disk-like portion 37 having formed at its periphery for a portion of the circumference thereof a curved flange 38 shaped to partially embrace the cylindrical portion of the body 27 for an extent greater than the diameter of the passage 28, the circumferential extent of the flange 38 including an arc of somewhat more than 90°. The lever 36 is confined to the stud 35 by a washer 39 and a pin 40, which latter traverses an appropriate hole through the stud 35, the pin 40 being preferably a cotter pin. The flange 38 is formed with a circumferential recess 41 about midway of its length axially and of a diameter and length adapted to receive a link of a chain 26 in the showing of Fig. 1, when the side members of the link are in substantially parallel relation with the side walls of the recess, but this recess is too narrow to permit the next link to pass through so long as the link maintains the same relation to the recess 41 that it has to the link already seated in said recess.

In use, the chain tends to engage the lower portion of the passage 28, whereby the link of the chain against the outer wall of the flange 38 will tend to approach the ledge 31. There is, therefore, a force brought to bear upon the flange 38 tending to move it toward the ledge 31, and thus that edge of the flange 38 where the recess 41 opens is held firmly against the ledge 31 by the constraining action of the chain, and so long as the chain remains taut the flange 38 will lock the chain, its tendency being augmented by the normally pendent position of the handle portion 36 of the lever 36 which is directed downwardly when the flange 38 is in locking relation to the chain. It requires considerable force to move the lever 36 to carry the flange 38 out of locking relation to the chain when the latter is taut, so that accidental unlocking of the chain is practically eliminated.

In order to protect the chain-lock from unauthorized manipulation and to further contribute to the safety of the structure by preventing accidental release of the chain, a padlock 54 shown in Fig. 4 may have its shackle passed through the yoke 34 and about the handle portion 36 of the lever 36 adjacent thereto, thereby securing the lever in the locking position in a manner preventing movement of the lever either purposely or accidentally, so that none but authorized persons can cause the release of the chain.

The same lock is capable of securing the chain to a post 55 or other support shown in Fig. 4 and in this case the chain is carried through the yoke 34, thence about the post 55 and finally through the passage 28 to be locked in the manner already described. In the structure shown in Figs. 4 and 5 the ears 29 are not needed and may be omitted.

What is claimed is:—

1. A chain lock comprising a block formed with a passageway for a chain, and a lever mounted on the block with its pivotal axis transverse to the longitudinal axis and substantially midway of the passage in the block, said lever having one end concentric with the axis of movement of the lever and provided with a recess adapted to be moved into and out of traversing relation to one end of the passageway through the block.

2. A chain-lock comprising a block having a portion of its surface cylindrical and provided with a substantially diametric passageway, and a lever mounted on the block with its pivotal axis coincident with the longitudinal axis of the cylindrical portion of the block and having a flange in the form of a partial cylinder concentric with the cylindrical portion of the block and provided with a recess in one edge movable into and out of traversing relation to one end of the passageway through the block.

3. A chain lock comprising a block having a portion of its surface cylindrical and provided with a substantially diametric passageway, and a lever mounted on the block with its pivotal axis coincident with the longitudinal axis of the cylindrical portion of the block and having a flange of incomplete cylindrical form concentric with the cylindrical portion of the block and provided with a recess in one edge movable into and out of traversing relation in one end of the passageway through the block, and a stop member for the partially cylindrical arm of the lever in position to be engaged by the said arm when the recess therein is in traversing relation to the passageway through the body of the block.

4. A chain lock comprising a block having a portion of cylindrical form with a substantially diametric passageway therethrough, stops on the block at both ends of the passageway therethrough, and a lever pivotally mounted on the block with its pivotal axis coinciding with the longitudinal axis of the cylindrical portion of the block and provided with a partially cylindrical portion movable concentric with the longitudinal axis of the block, said cylindrical portion being provided at one edge with a circumferentially arranged recess movable into and out of traversing relation to one end of the passageway through the block, and said cylindrical portion being adapted to engage either of the stops carried by the block.

5. A chain lock comprising a block of substantially cylindrical form having a substantially diametric passageway therethrough, a lever pivotally supported by the block with its pivotal axis coinciding with the longitudinal axis of the cylindrical portion of the block and provided with a curved flange exterior to and concentric with the cylindrical surface of the block, said flange having a recess movable into and out of traversing relation to one end of the passageway through the block, and said lever having an arm remote from said flange, and a yoke member carried by the block in position to receive the shackle of a pad lock when such shackle is in embracing relation to said arm of the lever.

6. A chain lock comprising a body member with a passage therethrough for a chain, and a lock lever having one end in embracing relation to the body member and with its pivotal axis in transverse relation to the passage through the block to cause the said end of the lever to move about the pivot transversely to the direction of the length of the chain when lodged in the passage, said lever having the said end provided with a recess movable into and out of registration with the passageway through the body member and also provided with a manipulating handle.

7. A chain lock comprising a body member with a passage therethrough for a chain and a pivoted lock member having its pivotal axis substantially midway of and located perpendicular to the longitudinal center line of the passage through the body member and also having a locking portion shaped to engage and hold the chain when in the passageway and movable over one end of the passageway transversely thereof and concentric to the pivotal axis.

In testimony that I claim the foregoing as my own, I have hereto affixed my signature in the presence of two witnesses.

CHARLES ALBERT McCARTHY.

Witnesses:
ELIAS SIMON,
BESSIE SIMON.

Copies of this patent may be obtained for five cents each, by addressing the "Commissioner of Patents, Washington, D. C."